United States Patent Office 3,407,233
Patented Oct. 22, 1968

3,407,233
DIMETHYLAMINOALKOXY-DI- AND TRI-METHOXY-CHALCONES AND THE SALTS THEREOF
Albert M. Packman, Dresher, Pa., assignor to William H. Rorer, Inc., Fort Washington, Pa., a corporation of Pennsylvania
No Drawing. Continuation-in-part of application Ser. No. 388,003, Aug. 6, 1964. This application Nov. 8, 1966, Ser. No. 592,746
6 Claims. (Cl. 260—570.7)

This is a continuation-in-part of the copending application, S.N. 388,003, filed Aug. 6, 1964, and now abandoned.

This invention relates to novel chemical compounds and more particularly to dimethylaminoalkoxymethoxy-chalcones and non-toxic acid solution salts thereof.

The dimethylaminoalkoxymethoxychalcones of this invention have the following formula:

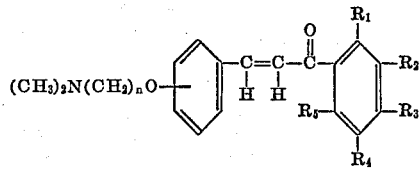

in which $n$ is 2 or 3, $R_1$, $R_2$, $R_3$, $R_4$ and $R_5$ are hydrogen or methoxy, at least two of $R_1$, $R_2$, $R_3$, $R_4$ and $R_5$ being methoxy.

The compounds have antihypertensive properties in the animal organism when administered parenterally or orally.

The compounds of this invention may be administered to mammals in any convenient dosage unit form with or without diluents, or adjuvants, such as in the form of pills, tablets, capsules or solutions.

The compounds of this invention are prepared by initially reacting in the presence of sodium exthoxide a benzaldehyde having the following formula:

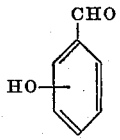

with a dimethylaminoalkoxy chloride having the following formula:

$(CH_3)_2N(CH_2)_nCl$ in which $n$ is 2 or 3. This reaction produces a dimethylaminoalkoxybenzaldehyde in accordance with the following reaction:

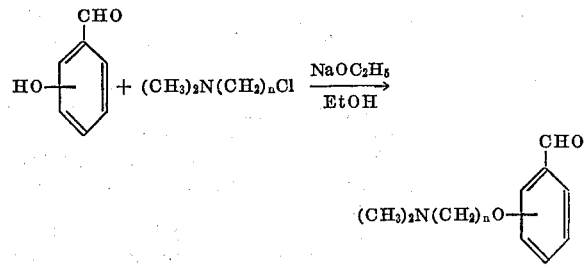

The resulting dimethylaminoalkoxybenzaldehyde is reacted, in the presence of sodium hydroxide, with an acetophenone having the following formula:

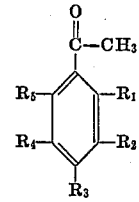

in which $R_1$, $R_2$, $R_3$, $R_4$ and $R_5$ are hydrogen or methoxy, at least two of $R_1$, $R_2$, $R_3$, $R_4$ and $R_5$ being methoxy. The reaction which occurs is as follows:

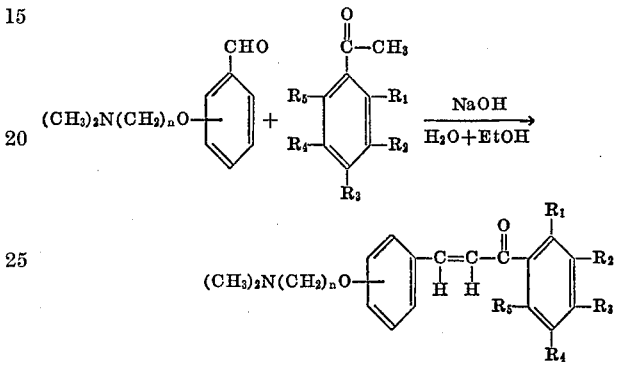

Heating of the chalcone prior to purification should be avoided.

If acid addition salts are desired, they are produced by reacting the resulting chalcone with the appropriate acid under anhydrous conditions. For example, if the succinate or malate acid addition salt is desired, succinic acid or malic acid is reacted with the chalcone under anhydrous conditions to produce the required acid addition salt.

Alternatively, the chalcone may be produced by reacting the hydroxybenzaldehyde with the substituted acetophenone. The resulting reaction product may then be reacted with dimethylaminoalkyl chloride in the presence of sodium ethoxide to produce the desired chalcone.

A more comprehensive understanding of this invention is obtained by reference to the following examples:

Example I.—2-(2-dimethylaminoethoxy)-3',4',5'-trimethoxychalcone hydrochloride (A) 2-(2-dimethylaminoethoxy) benzaldehyde may be prepared by taking a solution of 2.3 g. (0.1 mole) of sodium in 250 cc. of absolute ethanol and adding 12.2 g. (0.1 mole) of salicylaldehyde. This solution is refluxed for two hours, after which, the ethanol is removed under vacuum. A solution of 10.8 g. (0.1 mole) of β-dimethylaminoethyl chloride in 250 cc. of toluene is added to the residue and this is refluxed for 4 hours. The mixture is filtered and the filtrate distilled yielding 2-(2-dimethylaminoethoxy) benzaldehyde as distillate.

(B) 17 g. of 2-(2-dimethylaminoethoxy) benzaldehyde and 18.7 g. of 3,4,5-trimethoxyacetophenone are dissolved in 50 ml. ethanol and a solution of 5 g. of sodium hydroxide in 5 ml. of water is added. After 4–5 hours at room temperature, the reaction mixture is poured on ice and extracted with ether. The ether is dried, filtered and the filtrate treated with a saturated solution of hydrogen chloride in ether. The precipitate formed as final product is filtered and recrystallized from alcohol. The resulting hydrochloride has a melting point of 168–170° C.

Example II.—2-(2-dimethylaminoethoxy)-3',4',5'-trimethoxychalcone hydrochloride 21.0 gm. of 3,4,5-trimethoxyacetophenone and 12.2 gm. of salicylaldehyde are dissolved in 120 ml. of ethanol, and a solution of 7.1 gm. sodium hydroxide in 12 ml. of water is added. After standing 24 hours at room temperature, the solution is poured into a mixture of dilute hydrochloric acid and crushed ice and this is allowed to stand for several hours longer. The solid which is obtained is then filtered and dried. The yellow precipitate is recrystallized from absolute ethanol yielding 25.4 gm. of 2-hydroxy-3',4',5'-trimethoxychalcone melting at 135–136° C.

25.1 gm. of 2-hydroxy-3',4',5'-trimethoxychalcone is added to a solution of 1.9 gm. sodium in 500 cc. of ethanol and the mixture is refluxed for 2 hours. The ethanol is then distilled over and replaced by toluene. To this is added 10 gm. of β-dimethylaminoethylchloride and the mixture is refluxed with stirring for four hours. The mixture is then filtered and the filtrate is extracted several times with dilute hydrochloric acid. The acid solution is made basic with sodium carbonate and then extracted with ether. The ether solution is dried, filtered and the filtrate is treated with a saturated solution of hydrogen chloride in ether. The precipitate is filtered and recrystallized from alcohol yielding 12.3 g. of 2-(2-dimethylaminoethoxy)-3',4',5'-trimethoxychalcone hydrochloride, M.P. 168–170° C.

Heating of the final product prior to recrystallization should be avoided.

The following table shows the gross blood pressure changes following intravenous administration of 2-(2-dimethylaminoethoxy)-3',4',5'-trimethoxychalcone hydrochloride in dogs:

TABLE I

| Dose (mg./kg.) | No. Dogs | Average Changes (mm.) | | Duration |
| | | Systolic | Diastolic | |
| --- | --- | --- | --- | --- |
| 1 | 1 | 0 | −15 | <1 minute. |
| 5 | 16 | −51 | −49 | >2 hours. |
| 10 | 6 | −122 | −88 | Indefinite. |

In another test, four dogs were anesthetized with sodium pentobarbital administered intravenously at a dose of 35 mg./kg. The duodenum was then exposed by means of a small midline abdominal incision. The drug, dissolved in a total volume of 10 cc. of water, was injected into the lumen of the duodenum by means of a small gauge needle. In each case the approximate onset time of drug action was approximately 15 minutes post injection. The maximum depressor effect varied with animal and dosage, but usually occurred by the second hour.

TABLE 2

| Dose (mg./kg.) | Average Changes (mm.) | | Duration |
| | Systolic | Diastolic | |
| --- | --- | --- | --- |
| 50 | −41 | −37 | >2 hours. |
| 50 | −59 | −42 | Do. |
| 100 | −99 | −53 | Do. |
| 100 | −56 | −37 | Do. |

Example III.—2-(2-dimethylaminoethoxy)-3',4'-dimethoxychalcone hydrochloride 3,4-dimethoxyacetophenone (5.4 gm., 0.03 mole) and 2-(2-dimethylaminoethoxy) benzaldehyde (5.8 gm., 0.03 m.) are dissolved in 32 ml. of ethanol. To the ethanol solution is added a solution of 1.9 g. of sodium hydroxide in 3.9 ml. of water and the resulting solution is stirred and permitted to stand overnight at room temperature. The reaction mixture is poured on ice and extracted with ether. The ether is dried, filtered and the filtrate is treated with a saturated solution of hydrogen chloride in ether. The precipitate is filtered and recrystallized from isopropanol.

The 2-(2-dimethylaminoethoxy)-3',4'-dimethoxychalcone hydrochloride produced has a melting point of 183–185° C.

A comparison of the calculated composition and elemental analysis of the hydrochloride is as follows:

*Analysis.*—Calcd. for $C_{21}H_{26}NO_4Cl$: C=64.36%, H=6.68%, N=3.57%. Found: C=64.35%, H=6.81%, N=.44%.

Example IV.—2(2-dimethylaminoethoxy)-2',4'-dimethoxychalcone hydrochloride 2,4-dimethoxyacetophenone (5.4 gms., 0.03 mole) and 2-(2-dimethylaminoethoxy) benzaldehyde (5.8 gms., 0.03 m.) are dissolved in 32 ml. of ethanol. To the ethanol solution is added a solution of 1.9 g. of sodium hydroxide in 3.9 ml. of water and the resulting solution is stirred and permitted to stand overnight at room temperature. The reaction mixture is poured on ice and extracted with ether. The ether is dried, filtered and the filtrate is treated with a saturated solution of hydrogen chloride in ether. The precipitate is filtered and recrystallized from isopropanol. The 2-(2-dimethylaminoethoxy)-2',4'-dimethoxychalcone hydrochloride produced has a melting point of 133–134° C.

A comparison of the calculated composition and elemental analysis of the hydrochloride is as follows:

*Analysis.*—Calcd. for $C_{21}H_{26}NO_4Cl$: C=64.36%, H=6.68%, N=3.57%. Found: C=64.59%, H=6.82%, N=3.51%.

Example V.—2-(3-dimethylaminopropoxy)-3',4',5'-trimethoxychalcone hydrochloride 3,4,5-trimethoxyacetophenone (7.4 g., 0.0352 mole) and 2-(3-dimethylaminopropoxy) benzaldehyde (7.35 g., 0.0352 mole) are dissolved in 70 ml. of ethanol. To the ethanol solution is added a solution of 1.9 g. of sodium hydroxide in 3.9 ml. of water and the resulting solution is stirred and permitted to stand overnight at room temperature. The reaction mixture is poured on ice and extracted with ether. The ether is dried, filtered and the filtrate is treated with a saturated solution of hydrogen chloride in ether. The precipitate is filtered and recrystallized from isopropanol.

The 2-(3-dimethylaminopropoxy)-3',4',5'-trimethoxychalcone hydrochloride produced has a melting point of 175–177° C.

A comparison of the calculated composition and elemental analysis of the hydrochloride is as follows:

*Analysis.*—Calcd. for $C_{23}H_{30}NO_5Cl$: C=63.37%, H=6.94%, N=3.21%, Cl=8.13%. Found: C=62.7%, H=7.22%, N=3.19%, Cl=8.23%.

Example VI.—4-(2-dimethylaminoethoxy)-3',4',5'-trimethoxychalcone hydrochloride 3,4,5-trimethoxyacetophenone (7.8 gms., 0.0372 mole) and 4-(2-dimethylaminoethoxy) benzaldehyde (7.1 g., 0.0372 mole) are dissolved in 39 ml. of ethanol. To the ethanol solution is added a solution of 1.9 g. of sodium hydroxide in 3.9 ml. of water and the resulting solution is stirred and permitted to stand overnight at room temperature. The reaction mixture is poured on ice and extracted with ether. The ether is dried, filtered and the filtrate is treated with a saturated solution of hydrogen chloride in ether. The precipitate is filtered and recrystallized from ethanol.

The 4-(2-dimethylaminoethoxy)-3',4',5'-trimethoxychalcone hydrochloride produced has a melting point of 194–196° C.

A comparison of the calculated composition and elemental analysis of the hydrochloride is as follows:

*Analysis.*—Calcd. for $C_{22}H_{28}ClNO_5$: C=62.62%, H=6.69%, N=3.32%. Found: C=62.62%, H=6.67%, N=3.40%.

The 2-(3-dimethylaminopropoxy) benzaldehyde employed in Example V is prepared in the same manner as 2-(2-dimethylaminoethoxy) benzaldehyde is produced in Example I except that 12.2 g. (0.1 mole) of γ-dimethylaminopropyl chloride is employed instead of the 10.8 g. of β-dimethylaminoethyl chloride.

The 4-(2-dimethylaminoethoxy) benzaldehyde of Example VI is prepared in the same manner that the 2-(2-dimethylaminoethoxy) benzaldehyde is produced in Example I except that the same quantity of p-hydroxybenzaldehyde is employed instead of the salicylaldehyde.

What is claimed is:

1. A chalcone and non-toxic acid addition salts thereof, said chalcone having the formula:

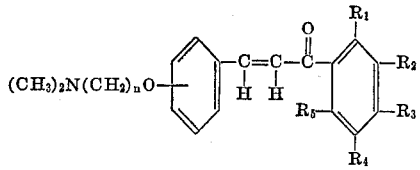

in which n is 2 or 3 and $R_1$, $R_2$, $R_3$, $R_4$ and $R_5$ are hydrogen or methoxy, at least two and not more than three of said $R_1$, $R_2$, $R_3$, $R_4$ and $R_5$ being methoxy.

2. A chalcone or a non-toxic acid addition salt thereof in accordance with claim 1 in which the dimethylaminoalkoxy group is in the 2 position of the benzene nucleus, $n$ is 2, $R_2$, $R_3$ and $R_4$ are methoxy and $R_1$ and $R_5$ are hydrogen, the hydrochloride of said chalcone having a melting point of 168–170° C.

3. A chalcone or a non-toxic acid addition salt thereof in accordance with claim 1 in which the dimethylaminoalkoxy group is in the 2 position of the benzene nucleus, $n$ is 2, $R_2$ and $R_3$ are methoxy and $R_1$, $R_4$ and $R_5$ are hydrogen, the hydrochloride of said chalcone having a melting point of 183–185° C.

4. A chalcone or a non-toxic acid addition salt thereof in accordance with claim 1 in which the dimethylaminoalkoxy group is in the 2 position of the benzene nucleus, $n$ is 2, $R_1$ and $R_3$ are methoxy and $R_2$, $R_4$ and $R_5$ are hydrogen, the hydrochloride of said chalcone having a melting point of 133–134° C.

5. A chalcone or a non-toxic acid addition salt thereof in accordance with claim 1 in which the dimethylaminoalkoxy group is in the 2 position of the benzene nucleus, $n$ is 3, $R_2$, $R_3$ and $R_4$ are methoxy and $R_1$ and $R_5$ are hydrogen, the hydrochloride of said chalcone having a melting point of 175–177° C.

6. A chalcone or a non-toxic acid addition salt thereof in accordance with claim 1 in which the dimethylaminoalkoxy group is in the 4 position of the benzene nucleus, $n$ is 3, $R_2$, $R_3$ and $R_4$ are methoxy and $R_1$ and $R_5$ are hydrogen, the hydrochloride of said chalcone having a melting point of 194–196° C.

References Cited

UNITED STATES PATENTS 2,668,813   2/1954   Goldberg et al. _ 260—570.7 XR

OTHER REFERENCES

Packman, "Amer. Jour. Pharm.," vol. 134, pp. 35–40 (1962)

CHARLES B. PARKER, *Primary Examiner.*

ROBERT V. HINES, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,407,233                                    October 22, 1968

Albert M. Packman

It is certified that error appears in the above identified patent and that said Letters Patent are hereby corrected as shown below:

Column 1, line 18, "solution" should read -- addition --.
Column 6, line 14, "n is 3" should read -- n is 2 --.

Signed and sealed this 17th day of March 1970.

(SEAL)
Attest:

Edward M. Fletcher, Jr.
Attesting Officer

WILLIAM E. SCHUYLER, JR.
Commissioner of Patents